US010935649B2

(12) United States Patent
Lynch

(10) Patent No.: US 10,935,649 B2
(45) Date of Patent: Mar. 2, 2021

(54) APERTURE CODING FOR TRANSMIT AND RECEIVE BEAMFORMING

(71) Applicant: GM Global Technology Operations LLC, Detroit, MI (US)

(72) Inventor: Jonathan J. Lynch, Oxnard, CA (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 279 days.

(21) Appl. No.: 16/060,540

(22) PCT Filed: Dec. 11, 2015

(86) PCT No.: PCT/US2015/065381
§ 371 (c)(1),
(2) Date: Jun. 8, 2018

(87) PCT Pub. No.: WO2017/099813
PCT Pub. Date: Jun. 15, 2017

(65) Prior Publication Data

US 2018/0348356 A1 Dec. 6, 2018

(51) Int. Cl.
*G01S 13/34* (2006.01)
*G01S 13/42* (2006.01)
*G01S 7/35* (2006.01)
*G01S 13/02* (2006.01)

(52) U.S. Cl.
CPC .............. *G01S 13/34* (2013.01); *G01S 7/352* (2013.01); *G01S 13/42* (2013.01); *G01S 2007/356* (2013.01); *G01S 2013/0263* (2013.01)

(58) Field of Classification Search
CPC ........... G01S 13/34; G01S 7/352; G01S 13/42
See application file for complete search history.

(56) References Cited

U.S. PATENT DOCUMENTS

| | | | | |
|---|---|---|---|---|
| 5,270,719 | A | 12/1993 | Roth | |
| 2003/0112172 | A1 | 6/2003 | Shinoda et al. | |
| 2006/0262007 | A1* | 11/2006 | Bonthron | G01S 13/44 342/70 |
| 2008/0030404 | A1 | 2/2008 | Irwin et al. | |

(Continued)

OTHER PUBLICATIONS

International Search Report and Written Opinion for PCT Application No. PCT/US2015/065381, dated Jul. 29, 2016, pp. 1-10.

*Primary Examiner* — Marcus E Windrich
(74) *Attorney, Agent, or Firm* — Cantor Colburn LLP

(57) ABSTRACT

A frequency-modulated continuous wave (FMCW) coded aperture radar (CAR) implemented on an integrated circuit (IC) to step through a range of frequencies in each sweep and a method of assembling the FMCW CAR implemented on an IC are described. The CAR implemented on the IC includes an antenna element to transmit or receive at a given time duration, a transmit channel to process a signal for transmission, the transmit channel including a transmit switch configured to change a state of a transmit phase shifter between two states based on a first code, and a receive channel to process a received signal, the receive channel including a receive switch configured to change a state of a receive phase shifter between two states based on a second code. A switch controller controls the first code and the second code and controls the first code to remain constant within the sweep.

14 Claims, 3 Drawing Sheets

200
210
$\omega(t)$
220
230
240
100
100
100
100
10
280
270
260
250

(56) References Cited

U.S. PATENT DOCUMENTS

| | | | | |
|---|---|---|---|---|
| 2009/0303126 | A1 | 12/2009 | Jain et al. | |
| 2011/0273326 | A1* | 11/2011 | Shirakawa | G01S 13/42 342/25 R |
| 2013/0169471 | A1* | 7/2013 | Lynch | G01S 13/343 342/107 |
| 2013/0169485 | A1* | 7/2013 | Lynch | G01S 3/46 342/417 |
| 2015/0160331 | A1 | 6/2015 | Lynch | |
| 2016/0109559 | A1* | 4/2016 | Delbecq | G01S 7/4056 342/170 |

* cited by examiner

APERTURE CODING FOR TRANSMIT AND RECEIVE BEAMFORMING

CROSS REFERENCE TO RELATED APPLICATIONS

This is a U.S. National Stage of PCT Application No. PCT/US2015/065381, filed on Dec. 11, 2015, the disclosure of which is incorporated in its entirety herein by reference.

FIELD OF THE INVENTION

The subject invention relates to aperture coding for transmit and receive beamforming.

BACKGROUND

Certain radar applications require high angular resolution. High-angular resolution requires a large aperture sensor array, which requires elements separated by a half wavelength. This leads to a large number of sensors and transmit/receive channels. The large number of transmit and receive channels can prove impractical due to their large cost. In addition to high angular resolution, low sidelobes are also important in radar sensors. Low sidelobes better isolate the angular location of objects and keep strong scatterers from dominating the signals when they are directly adjacent to weaker scatterers. For example, in the automotive application, trucks, which are strong scatterers, may be prevented from dominating the signals over motorcycles, which are relatively weaker scatterers, by keeping sidelobes low. Further, the ability to use fast Fourier transform (FFT) processing at the receiver, rather than correlation processing, simplifies the receiver in the radar system. Accordingly, it is desirable to provide a radar system that provides digital beamforming on both the transmit and the receive sides while maintaining the ability to use FFT processing.

SUMMARY OF THE INVENTION

In an exemplary embodiment, a frequency-modulated continuous wave (FMCW) coded aperture radar (CAR) implemented on an integrated circuit (IC) to step through a range of frequencies in each sweep includes an antenna element configured to transmit or receive at a given time duration; a transmit channel configured to process a signal for transmission, the transmit channel including a transmit switch configured to change a state of a transmit phase shifter between two states based on a first code; a receive channel configured to process a received signal, the receive channel including a receive switch configured to change a state of a receive phase shifter between two states based on a second code; and a switch controller configured to control the first code and the second code, wherein the switch controller controls the first code to remain constant within the sweep.

According to another exemplary embodiment, a method of assembling a frequency modulated continuous wave (FMCW) coded aperture radar (CAR) on an integrated circuit (IC) to step through a range of frequencies in each sweep includes disposing an antenna element to transmit or receive energy at a given time duration; arranging a transmit channel to process a signal for transmission; changing, using a transmit switch of the transmit channel, a state of a transmit phase shifter between two states based on a first code; arranging a receive channel to process a received signal; changing, using a receive switch of the receive channel, a state of a receive phase shifter between two states based on a second code; and controlling the first code and the second code using a switch controller, the switch controller controlling the first code to remain constant within the sweep.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

Figure 1:
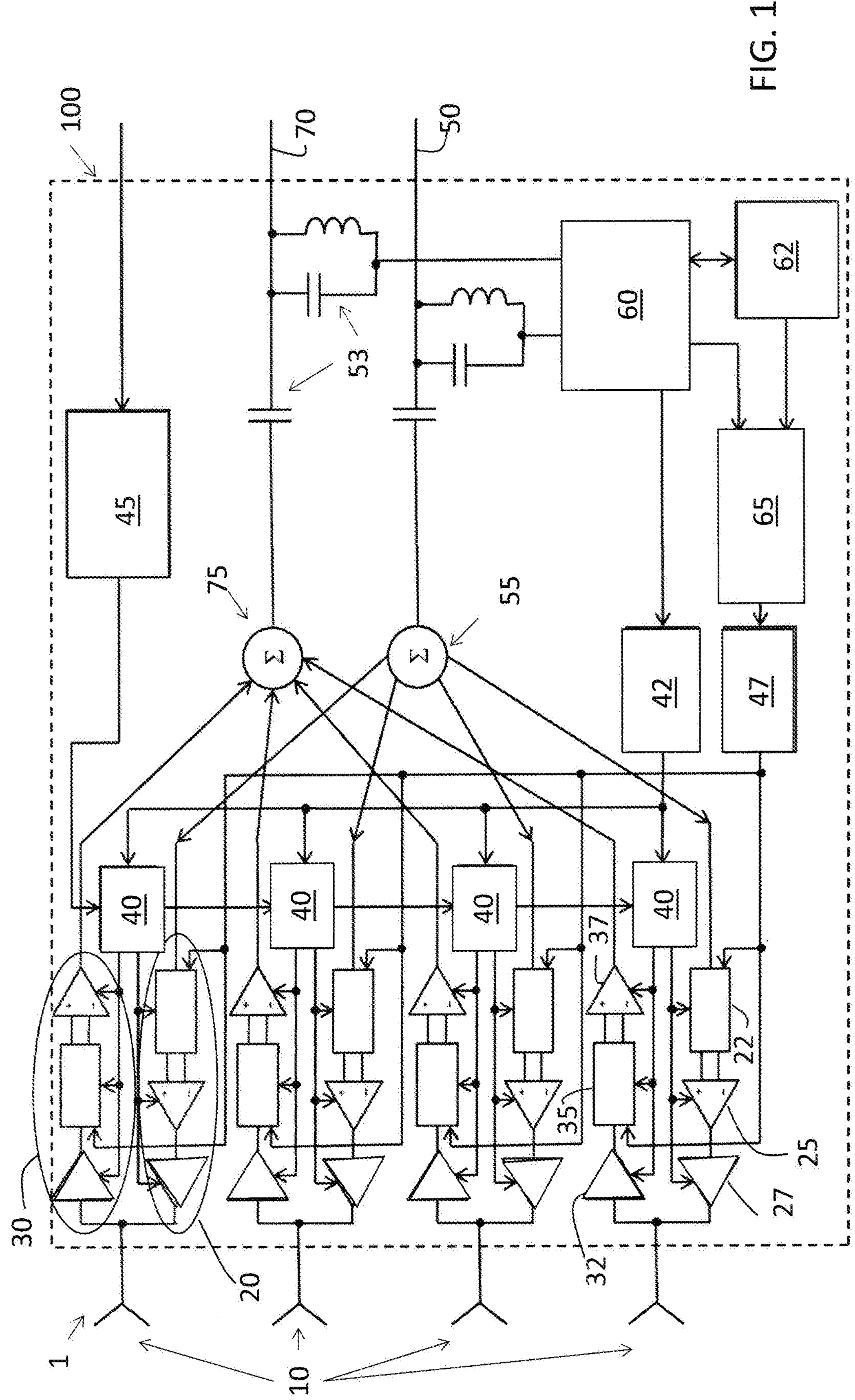
FIG. 1 illustrates a coded aperture radar (CAR) integrated circuit (IC) according to an exemplary embodiment.

The following description is merely exemplary in nature and is not intended to limit the present disclosure, its application or uses. It should be understood that throughout the drawings, corresponding reference numeral indicate like or corresponding parts and features.

As noted above, high angular resolution can be desirable in certain applications. Exemplary applications include autonomous driving and high-end active sensing features in vehicles. Embodiments of the systems and methods detailed herein relate to a radar system with digital beamforming (DBF) of transmit and receive beams with multiplicative beam patterns. Single-bit transceiver codes are used, as detailed below, to facilitate FFT processing of received signals. The embodiments are equally applicable to vehicles (e.g., automobiles, farm and construction vehicles) and to non-vehicles (e.g., consumer electronics, appliances, manufacturing systems).

In accordance with an exemplary embodiment of the invention, FIG. 1 illustrates a coded aperture radar (CAR) 1 integrated circuit (IC) 100. The exemplary CAR 1 includes an array of four antenna elements 10 that are shared by the transmit channel 20 and the receive channel 30. The CAR 1 includes other components outside the IC 100 that are known and not discussed herein. A Tx/Rx selector 40 coupled to a direct current (dc) power source 45 controls whether the transmit channel 20 or the receive channel 30 uses the respective antenna element 10 for each given transmit channel 20/receive channel 30 pair. The Tx/Rx selector 40 associated with each transmit channel 20/receive channel 30 pair is controlled by a central Tx/Rx selector 42 for the IC 100. A given antenna element 10 may be used to transmit or receive but not both at the same time. One antenna element 10 of the CAR 1 may transmit (associated Tx/Rx selector 40 selects the transmit channel 20) while another antenna element 10 of the CAR 1 receives (associated Tx/Rx selector 40 selects the receive channel 30). In alternate embodiments, the CAR 1 may include more or fewer antenna elements 10 than shown in FIG. 1. In alternate embodiments, the transmit channel 20 and receive channel 30 may not share the same antenna element 10.

Each transmit channel 20 includes a switch 22, a differential amplifier 25, and a power amplifier (PA) 27 and could include additionally known transmitter components. Each receive channel 30 includes a low noise amplifier (LNA) 32, switch 35, and differential amplifier 37 and could include additional components, as well. The CAR 1 is a frequency modulated continuous wave (FMCW) radar such that each transmission sweeps a range of frequencies. This sweep of a range of frequencies is repeated for a number of transmissions. The range of frequencies may be centered around 76.5 gigaHertz (GHz), for example, and is selected based on the specific application. The switches 22, 35 implement the code that is further detailed below. The switch 22, which is associated with the transmit channel 20 maintains the same code for a given frequency sweep. The switch 35, which is associated with the receive channel 30, may change the code (according to some sequence) within a frequency sweep but repeat the code sequence from sweep to sweep. The greater the number of codes used in the receive channel 30 for a given sweep, the lower the multiplicative noise level that arises from coded aperture beam forming and the lower the ambiguity in range, velocity, and angles. The operation according to this embodiment (i.e., maintaining transmit channel 20 code constant within a sweep and repeating the code sequence of the receive channel 30 from sweep to sweep) gives rise to multiplicative transmit and receive patterns that reduce sidelobes. In alternate embodiments, the code sequence of the receive channel 30 may not be repeated. The switches 22, 35 associated with each transmit channel 20/receive channel 30 pair are centrally controlled by a switch controller 47 of the IC 100.

Energy transmitted via one or more transmit channels 20 is input at input line 50 and is divided at splitter 55. The input line 50 may additionally include a serial communication line. In alternate embodiments, a dedicated line may be used for low-frequency communication. The communication line may be decoded at the asynchronous serial communication and decoding processor 60. In the exemplary embodiment shown in FIG. 1, the serial communication line of the input line 50 may include information to change a seed at 62 that is used by the pseudorandom generator at 65. The pseudorandom generator 65 generates the codes input to the switch controller 47. In alternate embodiments, the communication (provided over the input line 50 or in a dedicated line) may, itself, provide the codes to the switch controller 47 without the need for the seed at 62 and the pseudorandom generator at 65. Signals received by one or more of the receive channels 30 may be aggregated at 75 and output over an output line 70. The input line 50 and output line 70 may include filters 53, as shown in FIG. 1, and additional known components.

As noted above, the switch controller 47 controls each of the switches 22, 35 of each of the transmit channel 20/receive channel 30 pairs to implement a code. The code controls the phase shifter bit associated with each transmit channel 20 and receive channel 30. That is, the switch 22 and differential amplifier 25 determine if a transmitted signal is shifted 180 degrees or not (is shifted 0 degrees) based on the code provided by the switch controller 47 to the switch 22. On the receive channel side 30, the switch 35 and differential amplifier 37 determine whether the received signal is not shifted or is shifted 180 degrees based on the code provided to the switch 35 by the switch controller 47. As noted above, the code on the transmit channel 20 side is such that the code may not be changed during a given frequency sweep. Ensuring that the sweep duration is significantly longer (e.g., ten times) than the round trip delay time of the furthest scatterer ensures that all scattered signals resulting from one sweep are modulated by the same transmit code. This, in turn, facilitates the use of simple FFT processing (rather than the need for correlation processing) of received signals. The code on the receive channel 30 side is such that the code may be changed within a given frequency sweep in a sequence and this code sequence may be repeated from sweep to sweep to achieve multiplicative transmit and receive patterns for lower sidelobes. For the FMCW CAR 1, the code changes (in the transmit channel 20 and the receive channel 30) facilitate determination of angular information, the frequency sweeping facilitates determination of range information, and the change in phase from sweep to sweep due to radial movement of targets facilitates determination of radial velocity information. The CAR 1 according to the exemplary embodiments detailed herein facilitate high angular resolution and FFT processing.

Figure 2:
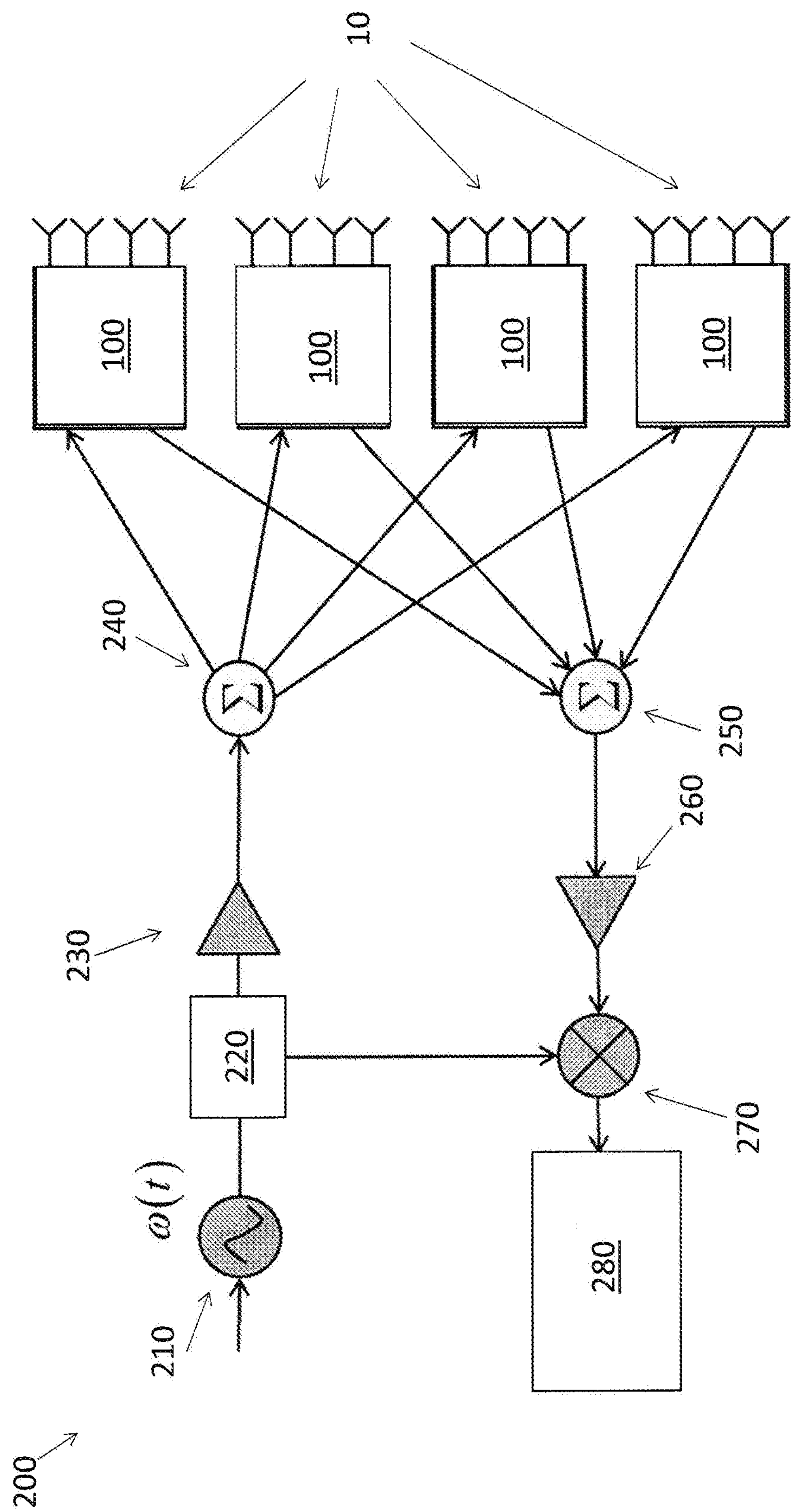
FIG. 2 is a block diagram of a system including an array of CAR ICs according to an exemplary embodiment.

FIG. 2 is a block diagram of a system 200 including an array of CAR 1 ICs 100 according to an exemplary embodiment. The exemplary system 200 shown in FIG. 2 includes four of the ICs 100 detailed in FIG. 1, with each CAR 1 on each IC 100 including four antenna elements 10. On the transmit side, a voltage controlled oscillator (VCO) 210 output is split by a splitter 220. One of the outputs of the splitter 220 is sent to a power amplifier 230 that amplifies the VCO 210 output and provides the RF input to the splitter 240 for distribution to each of the ICs 100. Energy received by the different antenna elements 10 is summed at 250, and the RF output is provided to a low noise amplifier (LNA) 260. The LNA 260 output is mixed with the VCO 210 output provided by the splitter 220 at the mixer 270. The mixer 270 output is converted to a digital output by the analog-to-digital converter (ADC) 280. The digital output may then be further processed. As noted above, the CAR 1 of each IC and the code employed in the transmit channel 20 and receive channel 30, as detailed above, facilitates high angular resolution and the ability to process the received signals with FFT processing.

Figure 3:
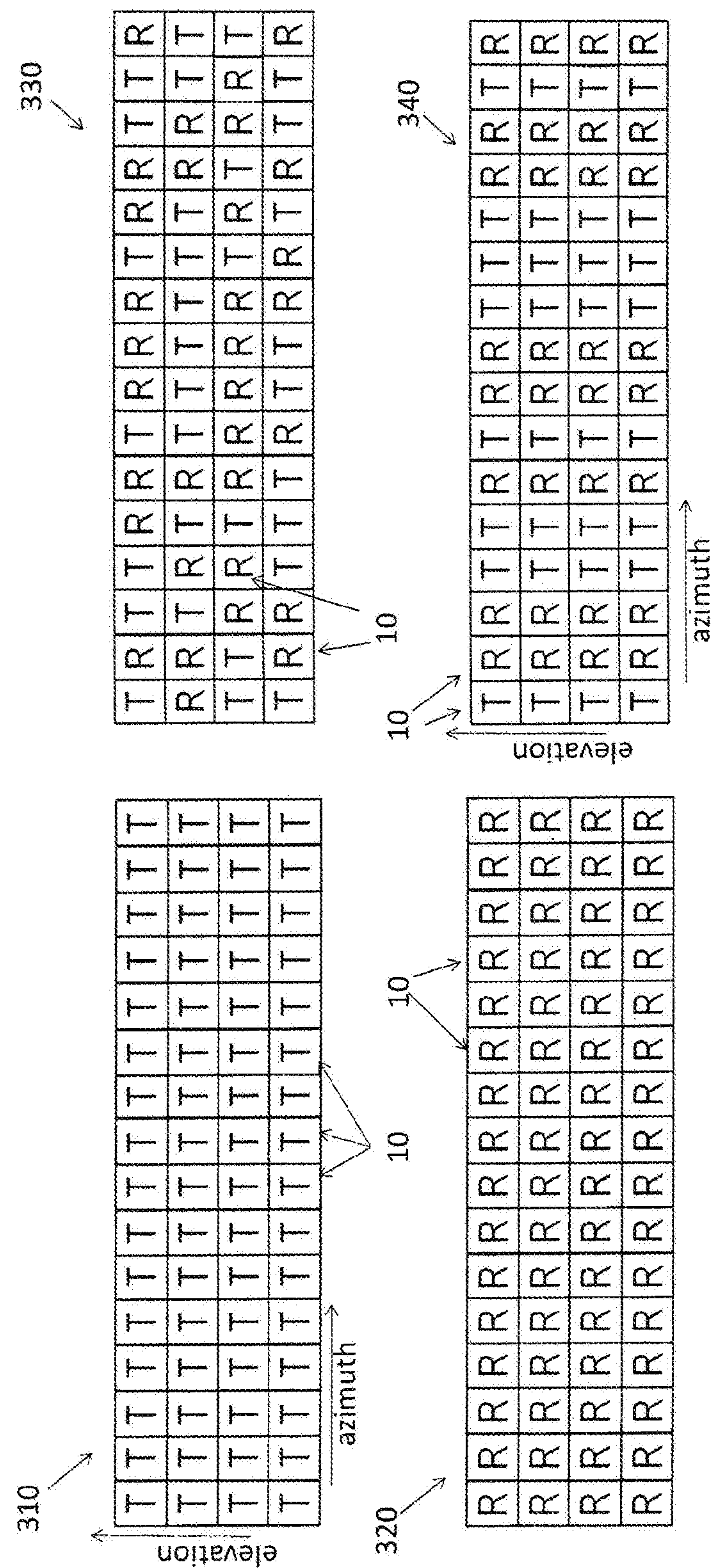
FIG. 3 illustrates exemplary arrangements of transmit and receive antenna elements in arrays according to embodiments.

FIG. 3 illustrates exemplary arrangements of transmit and receive antenna elements 10 in arrays according to embodiments. The antenna elements 10 may be arranged to result in the 16-by-4 array shown in FIG. 3. For each array 310, 320, 330, 340, each antenna element 10 is transmitting (T) or receiving (R) as indicated. As array 310 shows, all of the antenna elements 10 are transmitting. As array 320 shows, all of the aperture elements 10 are receiving. Arrays 330 and 340 indicate that some of the aperture elements 10 are transmitting while others are receiving. Array 340, in particular, indicates that the transmit and receive functions are interleaved along the azimuth orientation but do not vary along elevation. For any of the arrays shown in FIG. 3, the code could be varied as discussed above. That is, for the transmitting antenna elements 10, the code (and corresponding phase) may be changed from one sweep to the next. For the receiving antenna elements 10, the code may be changed even during a sweep.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. A frequency-modulated continuous wave (FMCW) coded aperture radar (CAR) implemented on an integrated circuit (IC) to step through a range of frequencies in each sweep, comprising:

a plurality of antenna elements, each antenna element configured to transmit or receive at a given time duration;

a plurality of transmit channels, each transmit channel configured to process a signal for transmission via a corresponding one of the plurality of antenna elements and each transmit channel including a transmit switch configured to change a state of a transmit phase shifter between two states based on a first code;

a plurality of receive channels, each receive channel configured to process a received signal from a corresponding one of the plurality of antenna elements and each receive channel including a receive switch configured to change a state of a receive phase shifter between two states based on a second code; and a switch controller configured to control the first code at the transmit switch of every one of the plurality of transmit channels and the second code at the receive switch of every one of the plurality of receive channels, wherein the switch controller controls the first code to remain constant within the sweep.

2. The CAR according to claim 1, wherein each of the plurality of antenna elements is a dedicated antenna element configured to only transmit based on being coupled to one of the plurality of transmit channels or to only receive based on being coupled to one of the plurality of receive channels.

3. The CAR according to claim 1, further comprising two or more transmit-receive selectors, each transmit-receive selector being associated with one of the plurality of antenna elements and each antenna element being configured to perform one of transmit or receive at the given time duration based on the transmit-receive selector and perform the other of transmit or receive at a different time duration based on the transmit-receive selector.

4. The CAR according to claim 1, wherein the switch controller controls the transmit switch associated with each of the plurality of the transmit channels and the receive switch associated with each of the plurality of the receive channels based on a control signal provided to the IC.

5. The CAR according to claim 1, wherein the switch controller changes the first code between the sweep and a subsequent sweep.

6. The CAR according to claim 1, wherein the switch controller changes the second code at each frequency step within the sweep in a sequence and repeats the sequence from sweep to sweep.

7. The CAR according to claim 1, wherein the switch controller changes the first code between the sweep and a subsequent sweep and changes the second code at each frequency step within the sweep in a sequence and repeats the sequence from sweep to sweep.

8. A method of assembling a frequency modulated continuous wave (FMCW) coded aperture radar (CAR) on an integrated circuit (IC) to step through a range of frequencies in each sweep, the method comprising:

disposing a plurality of antenna elements to transmit or receive energy at a given time duration;

arranging a plurality of transmit channels to each process a signal for transmission via a corresponding one of the plurality of antenna elements;

changing, using a transmit switch of each of the plurality of transmit channels, a state of a transmit phase shifter between two states based on a first code;

arranging a plurality of receive channels to process a received signal from a corresponding one of the plurality of antenna elements;

changing, using a receive switch of each of the plurality of receive channels, a state of a receive phase shifter between two states based on a second code; and controlling the first code at the transmit switch of every one of the plurality of transmit channels and the second code at the receive switch of every one of the plurality of receive channels using a switch controller, the switch controller controlling the first code to remain constant within the sweep.

9. The method according to claim 8, further comprising coupling each of the plurality of the antenna elements to either one of the plurality of transmit channels or one of the plurality of receive channels such that the disposing the plurality of antenna elements includes disposing a plurality of dedicated antenna elements that each only transmit or only receive.

10. The method according to claim 8, further comprising coupling each of the plurality of the antenna elements to both one of the plurality of transmit channels and one of the plurality of receive channels and selecting, using a transmit-receive selector, transmit or receive with the antenna element, wherein the selecting includes selecting to transmit at the given time duration and selecting to receive at a different time duration.

11. The method according to claim 8, wherein the controlling the transmit switch associated with each of the plurality of transmit channels and the receive switch associated with each of the plurality of receive channels is based on a control signal provided to the IC.

12. The method according to claim 8, wherein the controlling the first code and the second code includes the switch controller controlling the first code to change between the sweep and a subsequent sweep.

13. The method according to claim 8, wherein the controlling the first code and the second code includes the switch controller controlling the second code to change at each frequency step within the sweep in a sequence and repeating the sequence from sweep to sweep.

14. The method according to claim 8, wherein the controlling the first code and the second code includes the switch controller controlling the first code to change between the sweep and a subsequent sweep and controlling the second code to change at each frequency step within the sweep in a sequence and repeating the sequence from sweep to sweep.

* * * * *